April 17, 1956 G. O. LEGGETT Re. 24,143

ABRASIVE WHEEL ASSEMBLY

Original Filed Sept. 8, 1953

Guy O. Leggett, INVENTOR.

BY

P. L. Barlow

ATTORNEY

United States Patent Office

Re. 24,143
Reissued Apr. 17, 1956

24,143

ABRASIVE WHEEL ASSEMBLY

Guy O. Leggett, Van Nuys, Calif., assignor to Merit Products, Inc., Culver City, Calif.

Original No. 2,678,523, dated May 18, 1954, Serial No. 378,716, September 8, 1953. Application for reissue September 29, 1955, Serial No. 537,614

10 Claims. (Cl. 51—193.5)

Matter enclosed in heavy brackets [ ] appears in the original patent but forms no part of this reissue specification; matter printed in italics indicates the additions made by reissue.

This invention relates to an abrasive wheel assembly, the present application pertaining to an improvement in certain particulars of the flexible abrasive wheel of my co-pending United States application for patent, Serial No. 276,316, filed March 13, 1952, which issued September 15, 1953, as Patent No. 2,651,894.

The present invention relates to a simplification of the structure disclosed in my said co-pending application, and more particularly in regard to alternating non-abrasive flaps with abrasive ones and to applying to the inner part of the annular pack of abrasive flaps an improved non-metallic reinforcing means, thus making it possible to use a simplified clamping means to secure the assembled pack of flaps to the means for mechanically rotating them during the abrading operation.

Accordingly, one feature of the invention relates to the provision, as a new article of manufacture, of an annular pack of flaps, some provided with abrasive surface portions and others with non-abrasive faces only, and particularly well adapted to be clamped to a mechanically rotated means for performance of the polishing or abrading operation. Said pack of flaps constitutes a replacement unit which, when it becomes worn, can be quickly and easily removed from the rotating means and an unworn unit as readily substituted therefor.

Among the objects of the present invention are: to provide, in an abrasive wheel, an assembly of abrasive and non-abrasive flaps which can be manufactured at a lower cost and which can be more easily assembled; to provide for a better polishing operation; to provide a clamping means that can be relied upon to grip the assembled annular pack of abrasive flaps in a more dependable, secure manner for mechanical rotation at a high speed; and to improve various mechanical details of the structure with a view to rendering the device more durable and making it more dependable in its operation.

An additional, important object is to provide in an abrasive wheel, a combination of abrasive flaps with less costly non-abrasive ones, the non-abrasive flaps being interleaved with the abrasive ones in such a manner that the latter do not contact with and wear out each other during the rotation of the wheel, with the result that the usable life of the whole assembly is considerably lengthened.

Other objects, advantages and features of invention will hereinafter appear.

Referring to the accompanying drawing which illustrates a preferred, reduced to practice embodiment of the invention, Fig. 1 is a perspective view showing, per se, the replacement unit of the abrasive wheel which constitutes the new article of manufacture provided by the invention. Some of the flaps in the part of the wheel nearest to the observer are shown diverging from each other more than normally so as to illustrate to what flap surfaces the abrasive coating is applied. Throughout the remainder of the wheel the flaps thereof are shown in their normal position with parts of the wheel delineated in phantom lines to simplify illustration.

Figure 3:
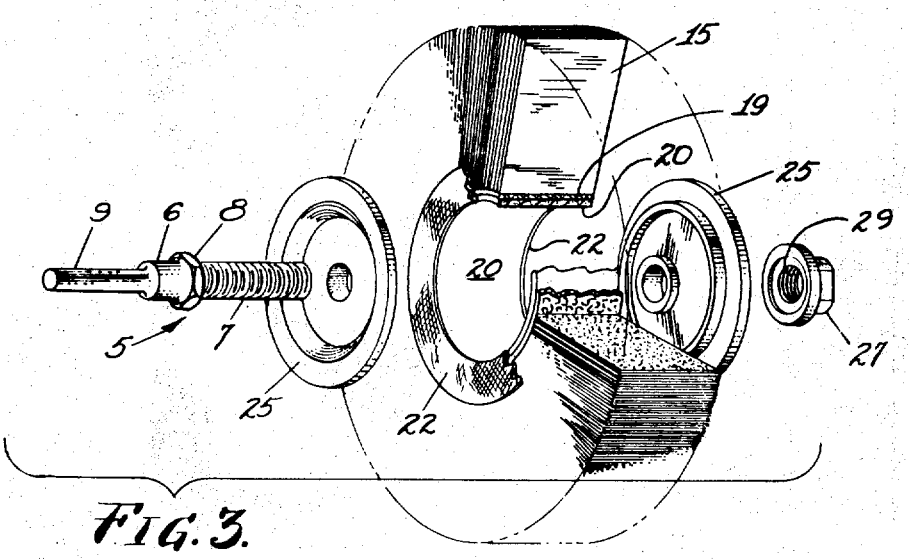
Fig. 3 is a perspective view of the complete wheel assembly showing the parts in an axially spaced relation to each other, the replacement element per se being delineated, partly by full and partly by phantom lines.

Referring in detail to the drawing, and particularly to Fig. 3, where the parts are shown in an axially extended relation to each other, the metallic arbor, generally designated 5, comprises a cylindrical body portion 6 which has a screwthreaded portion 7 occupying the greater part of its length, a hexagonal, peripheral flange 8 being shown at the inner end of said screwthreaded portion. Said arbor 5 has a shank 9 for connection with a driving means 10, ordinarily a chuck.

Said arbor 5 is located concentrically of an annular pack 12 of rectangular flaps which comprises abrasive flaps 14 alternating with non-abrasive flaps 15, said arbor carrying a pair of twin discs 17 which form a part of the means for mounting said annular packs.

A fabric strip 19 is adhered to the inner ends of the annularly assembled flaps.

An annular core member 20 desirably made of fiberboard or of a stiff strip of pasteboard has its exterior surface glued or otherwise firmly adhered to the inner surface of said fabric strip 19, and as an additional means for maintaining said pack in its annular form a pair of annular canvas strips 22 are adhered, one to each side of the inner portion of said pack, the inner edge portions of said strips overlying the ends of the aforesaid member 20 and being adhered to said ends.

Each of the aforesaid twin discs 17 is concavo-convex, its convex side being directed toward the midwidth of the structure of which it forms a part. These discs are centrally apertured so as to fit closely but slidably around the screwthreaded portion 7 of the aforesaid arbor, and each disc is shown provided around its central aperture with an annular flange 23 which projects from its convex side. The peripheral portion of each of said discs is provided internally with an annular flange or circular shoulder 24, and radially therebeyond with an annular flange portion 25, each of flanges 24 internally abutting the aforesaid annular member 20 and each said flange portion 25 abutting the outer face of the aforesaid canvas strip at its side of the device. A clamping nut 27 completes the mounting means for the pack of flaps, said nut preferably having its inner face recessed as indicated at 29, so that only its peripheral portion abuts the disc against which it is clamped.

The following method may be used to form the flaps:

A roll of abrasive cloth coated with the abrasive on one face only, one inch wide is mounted on a spindle, said spindle being carried by a vertical panel. Subjacent to this roll on a parallel spindle a roll of uncoated paper is mounted on the same panel. These strips carried by these two rolls are horizontally directed in a contacting relation to each other and are advanced by means of a pair of mechanically driven feed rollers between which they pass. These advancing contacting strips are intermittently cut off by a suitable mechanically operated knife, each cut off pair of flaps dropping down into a receiver and allowed to accumulate in said receiver until they form a long, vertical pack, for example, three feet in length. The receiver within which this pack is formed has an open side portion affording access to the pack so that the fabric strip 19 (see Figs. 2 and 3) may be glued to one side of the pack. After this has been done and the glue has become dry the pack is cut into lengths each of which equals the length of the pack required for each of the abrasive wheels.

The exposed face of said strip 19 is coated with a fresh adhesive substance and is then placed snugly round one of the aforementioned core members 20 and the adhesive allowed to dry so that said core member is firmly adhered to the pack. Then, a suitable cylindrical core is placed upon a horizontal surface in an upstanding position the diameter of this member being substantially equal to the internal diameter of said ring 20. Next, one of the annular canvas strips 22 has a coating of fresh adhesive applied to one of its faces and said strip is pushed down around said core member with its freshly coated face uppermost. Thereupon the annular pack is placed around the core member and its lower side placed against said freshly coated adhesive face, and finally the other canvas strip 22 is likewise coated with adhesive on one face and is passed downwardly over the upper end of the core member and has its freshly coated face pressed against the top surface of the pack. After this pair of strips 22 has adhered to the pack the new article of manufacture formed by the pack is complete.

Figure 1:
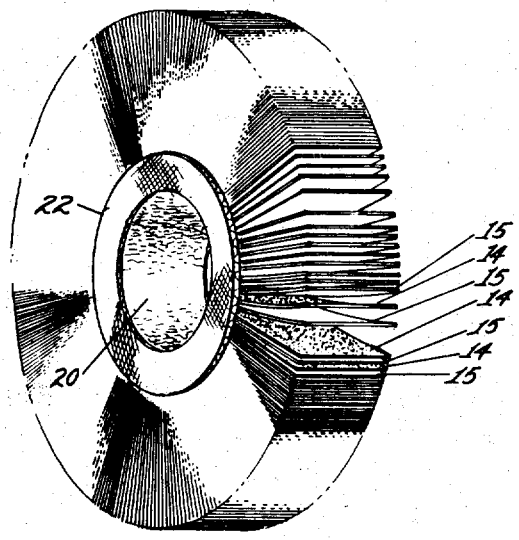
Figure 2:
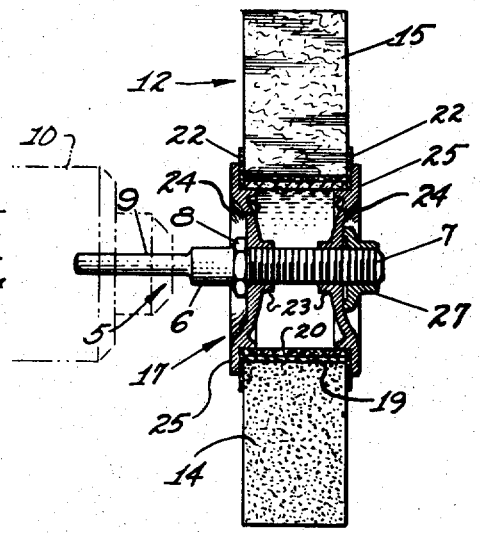
Fig. 2 is a vertical mid-section of the complete wheel assembly.

The mounting of the aforesaid pack upon and between the discs 25 provided therefor will be readily understood from what has already been said about the construction of the metallic part of the device, as shown in a spaced apart manner in Fig. 3 and assembled in Fig. 2.

The non-abrasive flaps are preferably made of a low priced wrapping paper. By their use the cost of manufacture is considerably reduced and also the wearing life of the wheel is increased about twenty-five per cent.

I claim:

1. As an article of manufacture, an annular pack of juxtaposed flaps, and means adhered to said flaps maintaining them circularly disposed around a central, circular space, alternate flaps of said pack each having a face coated with an abrasive substance, and the intervening flaps each having smooth faces.

2. The subject matter of claim 1 and said flaps having inner end edges and said means for holding said flaps in pack formation comprising a non-metallic ring occupying said central space and adhered to said end edges of the flaps of the pack where they border said space, and an annular fabric ring of sheet material at each side of the pack adhered to a side of the pack circumjacent to said circular space.

3. The subject matter of claim 1 and said flaps having inner end edges and said means for holding said flaps in pack formation comprising a non-metallic ring occupying said central space and adhered to said end edges of the flaps of the pack where they border said space, and an annular fabric ring of sheet material at each side of the pack adhered both to an end of said ring and to a side of the pack circumjacent to said circular space.

4. As an article of manufacture, an annular pack of juxtaposed flaps having inner end edges, and a pair of annular fabric strips of sheet material one of said strips having one of its faces adhered to one face of said pack circumjacent to the space which the pack surrounds and the other of said annular strips having one of its faces adhered to the opposite face of the pack circumjacent to the space which pack surrounds, alternate flaps of said pack each having a face coated with an abrasive substance and the intervening flaps each having smooth faces.

5. As an article of manufacture, an annular pack of juxtaposed flaps, and means adhered to said flaps maintaining them circularly disposed around a central, circular space, said pack comprising a series of circumferentially spaced apart flaps having face portions coated with an abrasive substance, the remaining flaps of the pack each having smooth faces.

*6. The method of forming abrasive grinding wheels comprising assembling a plurality of separate substantially rectangular leaves adjacent each other in a long row, holding said leaves in tight parallel proximity to each other with one of their end edges exposed, applying a coating of adhesive to the exposed edges of said leaves, applying an elongated fabric strip on top said adhesive, drying said adhesive, said adhesive binding said leaves to said fabric strip to form an elongated resilient strip of leaves capable of being handled without separation of said leaves from said strip, cutting said strip into a plurality of lengths corresponding to the inner circumference of the abrasive grinding wheels being formed, bending each of said lengths into a complete circle, and adhering the opposite side of each of said fabric strips to a substantially rigid circular core.*

*7. The method of forming an abrasive grinding wheel comprising assembling a plurality of separate substantially rectangular leaves adjacent each other in a long row, holding said leaves in tight parallel proximity to each other with one of their end edges exposed, applying a coating of adhesive to the exposed edges of said leaves, applying an elongated fabric strip on top of said adhesive, drying said adhesive, said adhesive binding said leaves together to form an elongated resilient strip of leaves capable of being handled without separation of said leaves from said strip, bending said strip of leaves into a complete circle, and adhering the opposite side of said fabric strip to a substantially rigid circular core.*

*8. The method of forming an abrasive grinding wheel comprising assembling a plurality of separate leaves adjacent each other in a long row, holding said leaves in tight proximity to each other with one of their edges exposed, applying a coating of adhesive to the exposed edges of said leaves, applying a flexible strip on top of said adhesive, drying said adhesive, said adhesive binding said leaves together to form an elongated resilient strip of leaves capable of being handled without separation of said leaves from said strip, bending said strip of leaves into a complete circle, and adhering the opposite side of said non-rigid strip to a circular core.*

*9. The method of forming an abrasive grinding wheel comprising assembling a plurality of separate leaves adjacent each other, at least some of said leaves carrying abrasive coating material, a portion of each of said leaves being exposed, attaching a flexible strip to the exposed portions of a substantial number of said leaves simultaneously with adhesive, drying said adhesive, said adhesive binding said leaves together to form an elongated resilient strip of leaves capable of being handled without separation of said leaves from said strip, bending said strip of leaves into a complete circle, and adhering said strip of leaves to a circular member.*

*10. The method of forming an abrasive grinding wheel comprising assembling a plurality of separate leaves adjacent each other in a long row, at least some of said leaves carrying an abrasive coating material, holding said leaves in tight proximity to each other with one of their edges exposed, applying a coating of adhesive to the exposed edges of a substantial number of said leaves simultaneously, applying a flexible strip on top of said adhesive, drying said adhesive, said adhesive binding said leaves together to form an elongated resilient strip of leaves capable of being handled without separation of said leaves from said strip, and bending said strip of leaves into a complete circle to form said abrasive wheel.*

References Cited in the file of this patent or the original patent

UNITED STATES PATENTS

| | | |
|---|---|---|
| 101,058 | Siiwerkrop | Mar. 22, 1870 |
| 244,699 | Ware | July 19, 1881 |
| 372,041 | Pfleghar | Oct. 21, 1887 |
| 410,749 | Colburn | Sept. 10, 1889 |
| 449,239 | Webster | Mar. 31, 1891 |

(Other references on following page)

UNITED STATES PATENTS

| | | |
|---|---|---|
| 455,277 | Cummins | June 30, 1891 |
| 596,014 | Condon et al. | Dec. 21, 1897 |
| 603,761 | Graham | May 10, 1898 |
| 612,157 | Cook | Oct. 11, 1898 |
| 648,890 | Williams | May 1, 1900 |
| 1,003,647 | Piper | Sept. 19, 1911 |
| 1,011,323 | Courtney | Dec. 12, 1911 |
| 1,023,807 | Brinkman | Apr. 23, 1912 |

| | | |
|---|---|---|
| 1,897,971 | Johnston | Feb. 14, 1933 |
| 2,015,646 | Hillix | Sept. 24, 1935 |
| 2,018,611 | Feuerstein | Oct. 22, 1935 |
| 2,136,747 | Levoy | Nov. 15, 1938 |
| 2,164,800 | Davis | July 4, 1939 |
| 2,423,992 | Nordgren et al. | July 15, 1947 |
| 2,444,093 | Crumbling et al. | June 29, 1948 |
| 2,506,288 | Bahr | May 2, 1950 |
| 2,524,626 | Harman | Oct. 3, 1950 |